United States Patent [19]

Russell

[11] Patent Number: 4,749,602

[45] Date of Patent: Jun. 7, 1988

[54] LAMBSWOOL HEEL SAVER MAT

[76] Inventor: Elaine T. Russell, 100 N. Walnut Creek Dr., Mansfield, Tex. 76063

[21] Appl. No.: 39,424

[22] Filed: Apr. 17, 1987

[51] Int. Cl.$^4$ .................... A47L 23/00; B32B 15/238
[52] U.S. Cl. .................................... 428/99; 428/100; 428/223; 428/280
[58] Field of Search ............... 428/95, 99, 100, 223, 428/280

[56] References Cited

U.S. PATENT DOCUMENTS

| | | | |
|---|---|---|---|
| 2,089,598 | 8/1937 | Cavanagh et al. | 180/90.6 |
| 2,136,980 | 11/1938 | Pim | 74/564 |
| 2,258,238 | 10/1941 | Collins | 180/90.6 |
| 3,114,272 | 12/1963 | Sawyer | 180/90.6 |
| 4,262,048 | 4/1981 | Mitchell | 428/99 |
| 4,465,720 | 8/1984 | Bell et al. | 428/95 |

*Primary Examiner*—Marion C. McCamish
*Attorney, Agent, or Firm*—H. Dennis Kelly

[57] ABSTRACT

This invention is a heel saver mat for the floorboard of a vehicle, the mat having an upper layer of lambswool and a lower layer of rubber or plastic. A plurality of skid resistant cleats are located on the lower side of the lower layer of rubber.

5 Claims, 1 Drawing Sheet

LAMBSWOOL HEEL SAVER MAT

BACKGROUND OF THE INVENTION

1. Field of the Invention

This invention relates in general to motor vehicle accessories. In particular, the invention relates to a new and improved apparatus to be applied to a motor vehicle to protect the heel of shoes, particularly for the driver of the vehicle.

2. Description of the Prior Art

Drivers and passengers of automobiles and other vehicles generally rest their feet on the floorboard of the vehicle. The floorboard is generally covered with a place mat. Movement of the driver's and passenger's shoes on the place mat tends to scratch, mar, and wear out the heels of the shoes. This is particularly true in the case of the driver's right foot, which is constantly in motion, while the driver is manipulating the brake pedal and the accelerator.

Supportive and protective pads have been designed for placement under the driver's feet. However, the pads, or the holders for the pads, were designed to be permanently attached to the floorboard of the vehicle. Such a design does not allow for an easy installation or for adjustment in the location of the mat.

SUMMARY OF THE INVENTION

The heel saver mat of the invention provides a protective mat which is easy to install, and easy to adjust. The heel saver mat has an upper layer of lambswool secured to a lower layer of rubber. The lower layer of rubber has a plurality of skid resistant cleats located on the lower side. The lambswool protects the driver's shoe, while the cleats prevent the mat from moving out of its position. However, the position of the mat can be easily adjusted by merely picking the mat up and moving it to another position.

DESCRIPTION OF THE PREFERRED EMBODIMENT

Figure 1:
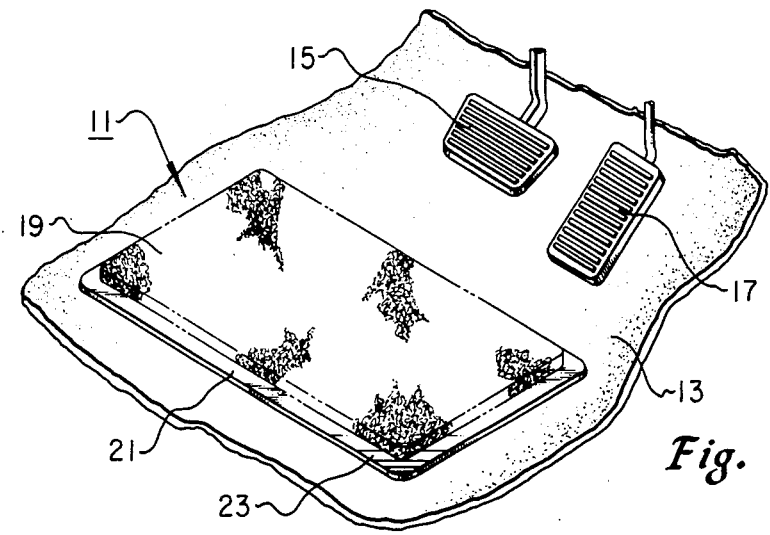
FIG. 1 is a perspective view of a heel saver mat of the invention.

As shown in FIG. 1, the heel saver mat 11 of the invention is designed to be placed on the floorboard 13 of a vehicle, below the brake pedal 15 and the accelerator 17. The mat 11 is easily installed, by merely placing the mat 11 in the position desired. The position of the mat 11 can be easily adjusted to the driver's preference.

Figure 2:
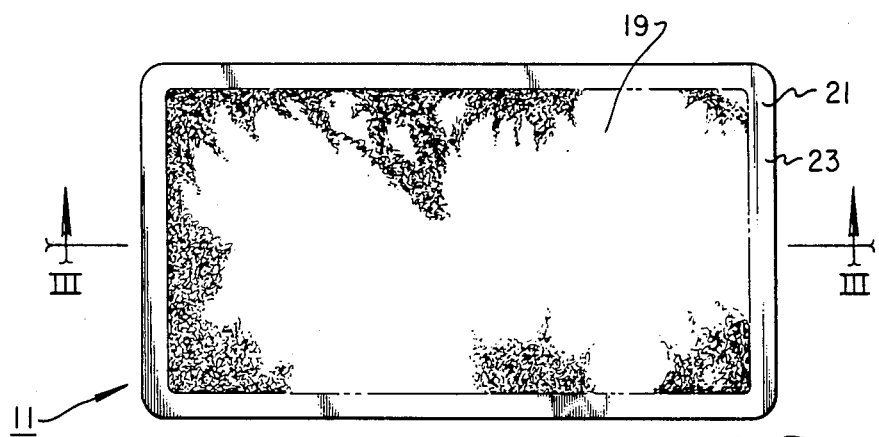
FIG. 2 is a top view of the heel saver mat of the invention.
Figure 3:
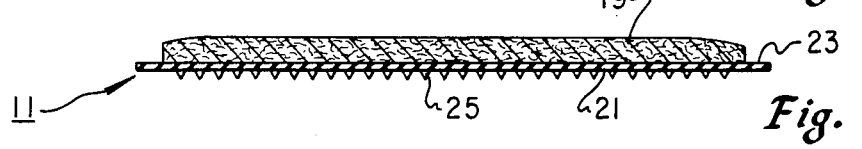
FIG. 3 is a sectional view of the heel saver mat of the invention, as seen along lines 3—3 in FIG. 2.

FIGS. 1–3 show that the heel saver mat 11 has two layers. The upper layer 19 is a layer of lambswool or sheepskin. The upper layer 19 is rectangular, being approximately 1 foot long and about 6 inches wide. The upper layer 19 is approximately $\frac{3}{8}$ inch to $\frac{7}{8}$ inch thick.

The upper layer 19 of wool is secured to a lower layer 21 of rubber or plastic. The lower layer 21 is also rectangular, but is slightly larger than the upper layer 19 of wool. There is thus a $\frac{1}{2}$ inch border 23 of uncovered lower layer 21 around the perimeter of the upper layer 19. The lower layer 21 is relatively thin, as shown in FIG. 3.

Figure 4:
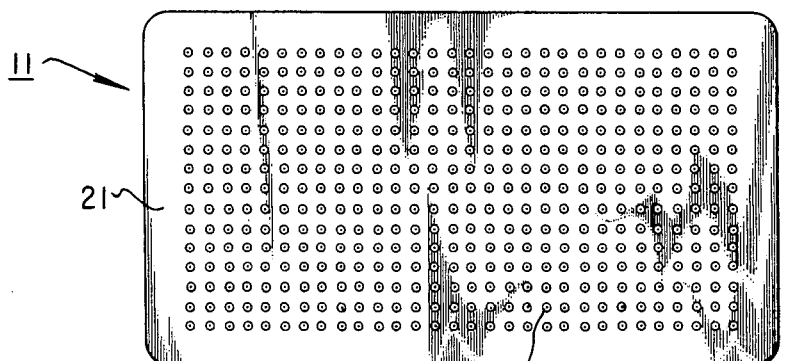
FIG. 4 is a bottom view of the heel saver mat of the invention.

FIG. 4 shows a plurality of skid resistant cleats 25 located on the bottom side of the lower layer 21. These cleats 25 extend into the floorboard 13 to hold the heel saver mat 11 in position.

The heel saver mat 11 of the invention has several advantages over the prior art. The mat 11 is easy to install, easy to adjust, and easy to remove. The skid resistant cleats 25 on the lower layer 21 of the mat 11 hold the mat 11 in position, but allow the mat 11 to be easily adjusted.

Only the preferred embodiment of the invention has been illustrated. It should be understood that the invention is not limited to the embodiment disclosed, but is capable of numerous rearrangements, modifications, and substitutions of parts and elements, without departing from the spirit of the invention.

I claim:

1. A heel saver mat for the floorboard of a vehicle, the mat comprising:
   an upper layer of lambswool;
   a lower layer of rubber, secured to the upper layer; and
   a plurality of skid resistant cleats, located on the lower side of the lower layer of rubber.

2. A floor mat for a vehicle, as recited in claim 1, herein the upper layer and the lower layer are rectangular.

3. A floor mat for a vehicle, as recited in claim 2, wherein the lower layer is longer and wider than the upper layer, leaving a border of uncovered lower layer around the perimeter of the upper layer.

4. A floor mat for a vehicle, as recited in claim 3, wherein the border is $\frac{1}{2}$ inch wide.

5. A floormat for a vehicle, as recited in claim 1, wherein the upper layer is between $\frac{3}{8}$ inch and $\frac{7}{8}$ inch thick.

* * * * *